(12) United States Patent
Kambegawa et al.

(10) Patent No.: US 7,619,790 B2
(45) Date of Patent: *Nov. 17, 2009

(54) IMAGE FORMING SYSTEM, IMAGE FORMING APPARATUS, AND CONTROL METHOD THEREOF

(75) Inventors: Minoru Kambegawa, Yokohama (JP); Seijiro Morita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/253,285

(22) Filed: Oct. 17, 2008

(65) Prior Publication Data

US 2009/0040556 A1 Feb. 12, 2009

Related U.S. Application Data

(63) Continuation of application No. 11/687,336, filed on Mar. 16, 2007, now Pat. No. 7,453,608, which is a continuation of application No. PCT/JP2006/325549, filed on Dec. 21, 2006.

(30) Foreign Application Priority Data

Dec. 22, 2005  (JP) .............................. 2005-370898
Dec. 19, 2006  (JP) .............................. 2006-341942

(51) Int. Cl.
    *H04N 1/46* (2006.01)
(52) U.S. Cl. ................. 358/500; 358/504; 358/1.1; 358/1.9; 399/111; 399/116; 399/301
(58) Field of Classification Search ................. 358/468, 358/1.1, 1.9, 1.17, 504, 3.26; 399/111, 113, 399/116, 301; 347/9, 116
See application file for complete search history.

(56) References Cited

U.S. PATENT DOCUMENTS

| 6,913,337 | B2 * | 7/2005 | Kuronuma et al. ........... 358/1.9 |
| 6,944,415 | B2 * | 9/2005 | Nomura ...................... 399/111 |
| 2003/0052959 | A1 | 3/2003 | Fujimoto .................... 347/116 |
| 2003/0174364 | A1 | 9/2003 | Goto ......................... 358/3.26 |
| 2003/0193536 | A1 | 10/2003 | Kuronuma et al. ............. 347/9 |
| 2004/0022556 | A1 | 2/2004 | Nomura ...................... 399/116 |

FOREIGN PATENT DOCUMENTS

| JP | 11-316663   | 11/1999 |
| JP | 2002-116394 | 4/2002  |
| JP | 2003-091374 | 3/2003  |
| JP | 2003-241131 | 8/2003  |
| JP | 2003-334994 | 11/2003 |
| JP | 2004-170755 | 6/2004  |
| JP | 2004-270755 | 6/2004  |

* cited by examiner

*Primary Examiner*—Kimberly A Williams
(74) *Attorney, Agent, or Firm*—Fitzpatrick, Cella, Harper & Scinto

(57) ABSTRACT

Correction for eliminating deformations of an image to be output from an image apparatus is executed while suppressing the processing load on the host computer side. A host computer acquires deformation information used to designate read addresses according to deformations of a scan line from a laser beam printer. A CPU (1) of the laser beam printer generates read addresses according to the deformation information to read out image data from a RAM, and transmits the readout image data to the laser beam printer. The laser beam printer (0) forms an image based on the image data received from the host computer (3000).

2 Claims, 12 Drawing Sheets

FIG. 8

| Beam No. | REGION | WIDTH [dot] | INCLINATION |
|---|---|---|---|
| K | REGION 1 | L1 | m1/L1 |
| | REGION 2 | L2 - L1 | m2 - m1 / L2 - L1 |
| | REGION 3 | L3 - L2 | m3 - m2 / L3 - L2 |

F I G. 9
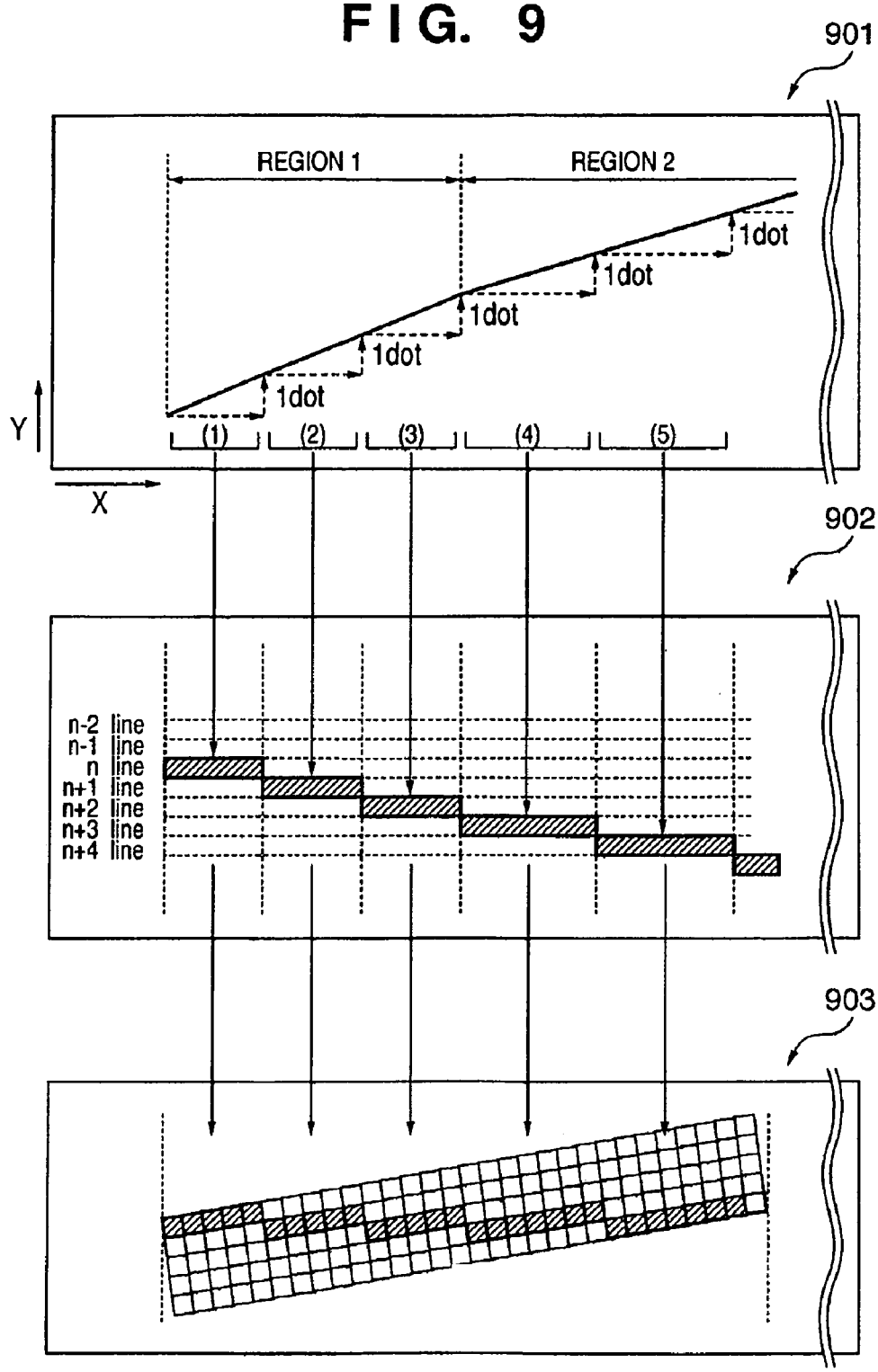

FIG. 10

| ATTRIBUTE INFORMATION || INTERPOLATION PROCESSING |
|---|---|---|
| CHARACTER | LOWER CASE | 1 |
| | UPPER CASE | 0 |
| LINE | THIN LINE | 1 |
| | THICK LINE | 0 |
| SOLID || 0 |
| PATTERN || 1 |
| IMAGE || 0 |
| ISOLATED POINT || 0 |

IMAGE FORMING SYSTEM, IMAGE FORMING APPARATUS, AND CONTROL METHOD THEREOF

CROSS-REFERENCE TO RELATED APPLICATIONS

This application is a continuation of application Ser. No. 11/687,336, filed Mar. 16, 2007, and claims benefit of the filing date of that application under 35 U.S.C. § 120, and claims priority benefit under 35 U.S.C. § 119 of the filing dates of Japanese patent applications nos. 2005-370898 and 2006-341942, filed Dec. 22, 2005, and Dec. 19, 2006, respectively. The entire disclosures of the three mentioned prior applications are incorporated herein by reference.

TECHNICAL FIELD

The present invention relates to an image forming system, image forming apparatus, and control method thereof.

BACKGROUND ART

In recent years, in order to increase the image forming speed in a color image forming apparatus of an electrophotography system, color image forming apparatuses of a tandem system, each of which comprises developers and photosensitive drums in a number as large as the number of color materials, and transfers images of different colors on an image conveyor belt or print medium, are increasing. In such a color image forming apparatus of a tandem system, there are a plurality of factors that cause registration errors (color discrepancy), and various strategies against respective factors have been proposed.

For example, one such factor is non-uniformity or a mounting position shift of a lens used in an exposure scan device used to expose each photosensitive drum. Another factor is an assembly position shift of the exposure scan device to the color image forming apparatus main body. With these factors, a laser scan line that exposes each photosensitive drum (image carrier) deforms with respect to the photosensitive drum, and if such deformation varies for respective colors, registration errors occur. As one of the strategies against such registration errors, a method described in patent reference 1 is known. With this method, the curvature of a laser scan line that exposes each photosensitive drum with respect to the photosensitive drum is measured in an assembly process of a polarization scan device, and the mounting position of the lens with respect to a polarization scan device is adjusted based on the measurement result.

Patent reference 2 discloses another method. In this method, in an assembly process of the exposure scan device in the color image forming apparatus main body, the deformation of a laser scan line that exposes each photosensitive drum with respect to the photosensitive drum is measured, and the assembly position of the exposure scan device to the color image forming apparatus main body is adjusted based on the measurement result.

Furthermore, patent reference 3 describes a method which measures the deformation of a laser scan line that exposes each photosensitive drum with respect to the photosensitive drum, corrects bitmap image data to cancel the measured deformation, and forms an image based on the corrected image data. This method can cope with registration errors with lower cost than the methods described in patent references 1 and 2, since it can electrically correct image data by processing it and can obviate the need for mechanical adjustments.

Patent reference 1: Japanese Patent Laid-Open No. 2002-116394
Patent reference 2: Japanese Patent Laid-Open No. 2003-241131
Patent reference 3: Japanese Patent Laid-Open No. 2004-170755

DISCLOSURE OF INVENTION

Problems that the Invention is to Solve

A printing apparatus (image forming apparatus) which converts print data described in a page description language received from an external apparatus such as a host computer or the like, and executes print processing is known. On the other hand, a printing apparatus which receives bitmap data (or compressed data obtained by compressing bitmap data) generated by an external apparatus and executes print processing based on that bitmap data (or compressed data) is also known. The latter printing apparatus is also called a host-based printing apparatus since the host computer generates bitmap data.

Upon applying the method of patent reference 3 to the host-based printing apparatus, the host computer must execute correction processing of image data required to cancel the curvature in addition to rendering processing for generating bitmap data. Hence, the processing load of image data is imposed on the host computer, and the processing speeds of other applications which run on the host computer decrease.

The present invention has been made in consideration of the above situation, and has as its object to provide a technique which can suppress the processing load on the host computer side, and can apply correction to remove any deformation of an image output from an image forming apparatus.

Means of Solving the Problems

In order to achieve the above object, a system according to the present invention is directed to an image forming system, which has a host computer and an image forming apparatus that forms an image based on image data received from the host computer, wherein the image forming apparatus comprises an image carrier which forms an electrostatic latent image on a surface by sensing light, exposure unit adapted to expose the image carrier based on the received image data, development unit adapted to develop the electrostatic latent image by applying a developing agent to the electrostatic latent image formed on the image carrier, and transfer unit adapted to form an image on a print sheet by transferring the developing agent image on the image carrier, and the host computer comprises storage unit adapted to store image data, acquisition unit adapted to acquire, from the image forming apparatus, deformation information indicating how an output image deforms with respect to image data input to the image forming apparatus, correction unit adapted to correct the image data in the storage unit to generate corrected image data so as to make the image forming apparatus form an image corresponding to the image data stored in the storage unit, and transmission unit adapted to transmit the corrected image data generated by the correction unit to the image forming apparatus.

In order to achieve the above object, an apparatus according to the present invention is directed to an image forming apparatus comprising:

first reception unit adapted to receive, from an external apparatus, first correction data, which is obtained by correcting, based on deformation information generated upon formation of image data, pixels in a vertical direction of the image data in a first unit;

second reception unit adapted to receive, from the external apparatus, horizontal correction information required to correct pixels in a horizontal direction of the image data based on the deformation information;

third reception unit adapted to receive, from the external apparatus, vertical correction information required to correct pixels, which cannot be corrected in the first unit in the vertical direction of the image data based on the deformation information, in a second unit;

correction unit adapted to generate correction data of the image data by correcting the first correction data using the horizontal correction information and the vertical correction information; and image forming unit adapted to form an image based on the correction data.

In order to achieve the above object, another system according to the present invention is directed to an image forming system which comprises an external apparatus and an image forming apparatus that can communicate with each other, wherein the external apparatus comprises first correction unit adapted to generate first correction data by correcting, based on deformation information generated upon formation of image data, pixels in a vertical direction of the image data in a first unit, first transmission unit adapted to transmit the first correction data to the image forming apparatus, generation unit adapted to generate horizontal correction information required to correct pixels in a horizontal direction of the image data based on the deformation information, and vertical correction information required to correct pixels, which cannot be corrected in the first unit in the vertical direction of the image data, in a second unit, and second transmission unit adapted to transmit the horizontal correction information and the vertical correction information to the image forming apparatus, and the image forming apparatus comprises reception unit adapted to receive the first correction data, the horizontal correction information, and the vertical correction information from the external apparatus, second correction unit adapted to generate correction data of the image data by correcting the first correction data using the horizontal correction information and the vertical correction information, and image forming unit adapted to form an image based on the correction data.

In order to achieve the above object, a method according to the present invention is directed to a method of controlling an image forming apparatus, which outputs image data received from an external apparatus, comprising:

a first reception step of receiving, from the external apparatus, first correction data, which is obtained by correcting, based on deformation information generated upon formation of image data, pixels in a vertical direction of the image data in a first unit; a second reception step of receiving, from the external apparatus, horizontal correction information required to correct pixels in a horizontal direction of the image data based on the deformation information; a third reception step of receiving, from the external apparatus, vertical correction information required to correct pixels, which cannot be corrected in the first unit in the vertical direction of the image data based on the deformation information, in a second unit; a correction step of generating correction data of the image data by correcting the first correction data using the horizontal correction information and the vertical correction information; and an image forming step of forming an image based on the correction data.

In order to achieve the above object, a program according to the present invention is directed to a program to be executed by a processor in an image forming apparatus, which outputs image data received from an external apparatus, the program making the image forming apparatus execute:

a first reception procedure for receiving, from the external apparatus, first correction data, which is obtained by correcting, based on deformation information generated upon formation of image data, pixels in a vertical direction of the image data in a first unit; a second reception procedure for receiving, from the external apparatus, horizontal correction information required to correct pixels in a horizontal direction of the image data based on the deformation information; a third reception procedure for receiving, from the external apparatus, vertical correction information required to correct pixels, which cannot be corrected in the first unit in the vertical direction of the image data based on the deformation information, in a second unit; a correction procedure for generating correction data of the image data by correcting the first correction data using the horizontal correction information and the vertical correction information; and an image forming procedure for forming an image based on the correction data.

Effects of the Invention

According to the present invention, an image forming apparatus which can suppress the processing load on the host computer side, and can apply correction to remove any deformation of an image output from an image forming apparatus can be provided.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 8 shows an example of deformation information;

FIG. 9 is a view showing correction of image data by means of coordinate conversion;

FIG. 10 shows a conversion table of attribute information;

BEST MODE FOR CARRYING OUT THE INVENTION

Preferred embodiments of the present invention will now be described in detail with reference to the drawings. Note that building components described in these embodiments are merely examples, and do not limit the scope of this invention.

First Embodiment

A printing system according to one embodiment of the present invention will be described below with reference to the accompanying drawings. Note that this embodiment uses a printing system in which a host computer and a printing apparatus are connected via a network. As the printing apparatus, a laser beam printer capable of monochrome printing is used.

Figure 1:
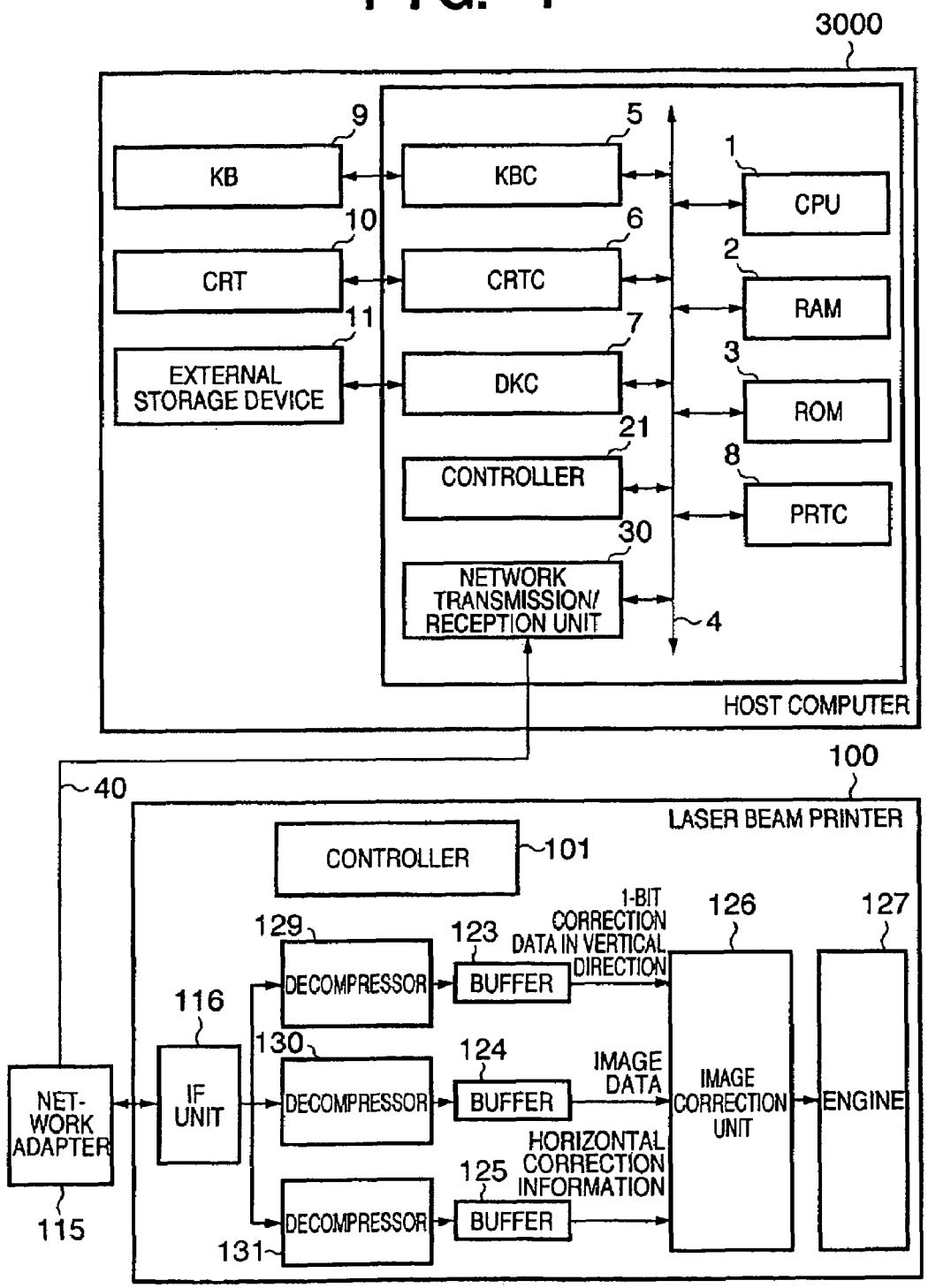
FIG. 1 is a block diagram showing the arrangement of a printing system according to the first embodiment of the present invention.

FIG. 1 is a block diagram showing the arrangement of a printing system according to the first embodiment of the present invention. Referring to FIG. 1, reference numeral 3000 denotes a host computer, in which a CPU 1 executes programs which are stored in an external storage device 11 and are loaded into a RAM 2. The programs to be loaded into the RAM 2 include device drivers used to execute scan processing and print processing, an application program for executing processing of documents that include any combinations of graphics data, image data, text data, table data (including a spreadsheet), and the like together based on a document processing program, and the like. Note that module configuration of software associated with this printing system will be described later.

The CPU 1 executes the above programs, and systematically controls devices connected to a system bus 4. The CPU 1 opens various registered windows based on commands given by a mouse cursor or the like (not shown) on a CRT 10, and executes various kinds of data processing. Note that a controller 21 executes various other kinds of control.

The RAM 2 serves as a main memory, work area, and the like of the CPU 1. Reference numeral 5 denotes a keyboard controller (KBC), which controls key inputs from a keyboard 9 and a pointing device (not shown). Reference numeral 6 denotes a CRT controller (CRTC), which controls display on the CRT 10. Reference numeral 7 denotes a disk controller (DKC) which controls access to the external storage device 11 such as a hard disk (HDD), flexible disk (FD), CD-ROM, or the like. Note that the hard disk stores a boot program, various applications, font data, user files, edit files, and the like. Reference numeral 8 denotes a parallel input/output controller (PRTC) which implements two-way communication control processing with a laser beam printer 100 via a two-way parallel interface (not shown) upon connecting a local printer.

Reference numeral 30 denotes a network transmission/reception unit on the host computer 3000, which transmits image data and control commands to a network adapter 115 via a network 40 such as a LAN or the like, and receives responses to commands from the laser beam printer 100.

In the host computer 3000, the CPU 1, the RAM 2, a ROM 3, the PRTC 8, the KBC 5, the CRTC 6, the DKC 7, the controller 21, and the network transmission/reception unit 30 are connected to each other via the system bus 4.

On the other hand, referring to FIG. 1, the laser beam printer 100 is connected to the host computer 3000 via the network 40 and network adapter 115. The laser beam printer 100 comprises a controller 101 which makes various kinds of control, an IF unit 116 connected to the network adapter 115, three decompressors 129, 130, and 131, and three buffers 123, 124, and 125. Furthermore, the laser beam printer 100 comprises an image correction unit 126 used to correct an image, as will be described later, and a print engine 127 which performs image formation.

Figure 3:
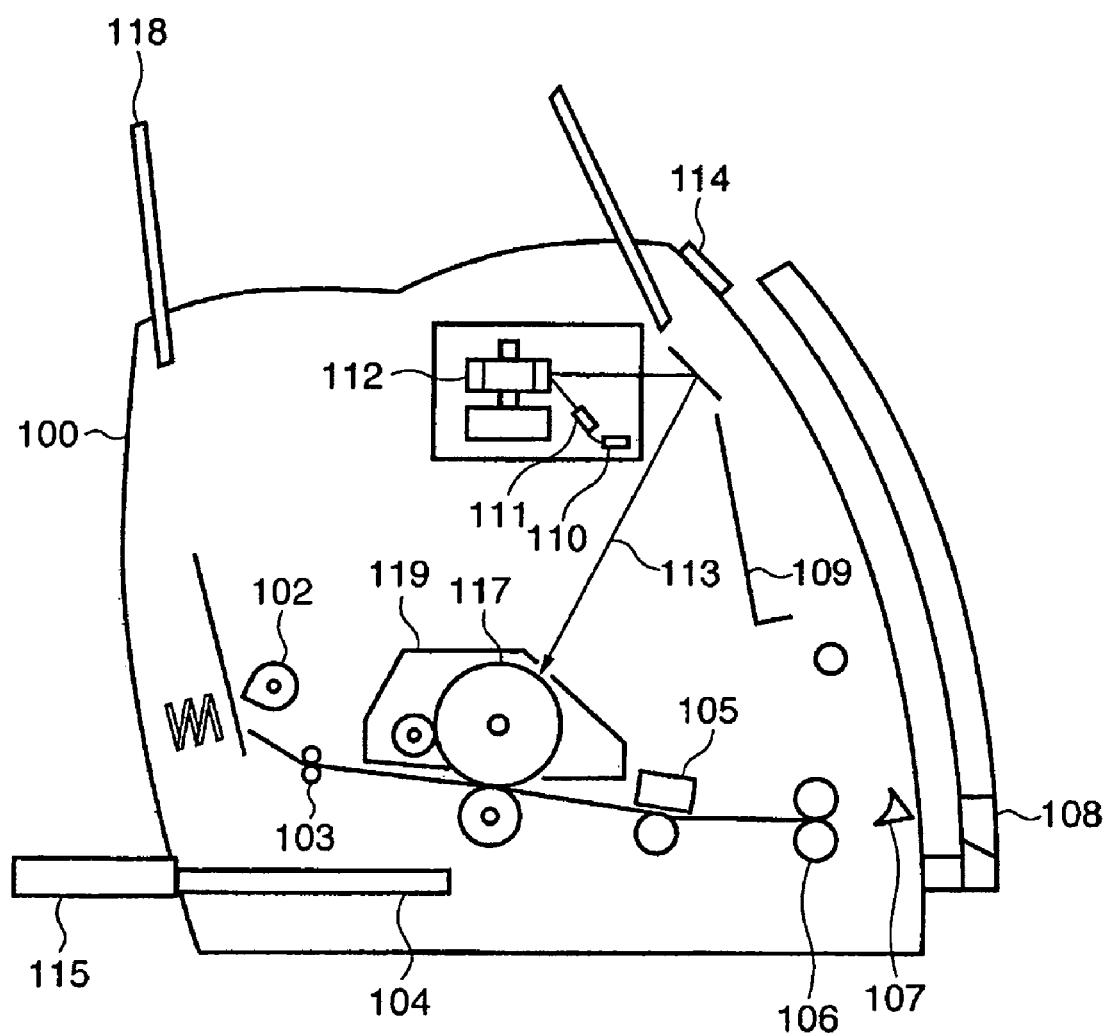
FIG. 3 is a sectional view showing the detailed arrangement of the laser beam printer (LBP) 100 in the printing system according to one embodiment of the present invention.

FIG. 3 is a sectional view showing the detailed arrangement of the laser beam printer (LBP) 100 in the printing system according to the first embodiment of the present invention.

Referring to FIG. 3, reference numeral 100 denotes a laser beam printer main body, which forms already rasterized print data, which is supplied from the connected host computer, as an image on a print sheet or the like as a print medium. Note that this print data includes control data and image data (bitmap data), and the host computer compresses image data and sends compressed image data to the laser beam printer.

Note that the printing apparatus (image forming apparatus) of the first embodiment is called a host-based printing apparatus since it executes print processing based on bitmap data generated by the host computer, as described above.

Reference numeral 104 denotes a control unit for the entire laser beam printer 100. This control unit 104 decompresses image data received from the host computer 3000, converts the decompressed data into a video signal, and outputs the video signal to a laser driver 110. Note that an image correction unit and the like in the laser beam printer will be described later.

Upon reception of the video signal output from the control unit 104, the laser driver 110 switches ON/OFF of a laser beam 113 emitted by a semiconductor laser 111. The laser beam 113 scans an electrostatic drum 117 for respective lines by being deflected in the right-and-left directions upon rotation of a rotary polygonal mirror 112, and forms an electrostatic image of a print pattern on the electrostatic drum 117. A toner cartridge 119 supplies toner (developing agent) to the electrostatic drum 117, thus developing the image by attaching the toner to it. Furthermore, the toner cartridge 119 attaches the toner to the electrostatic image formed on the electrostatic drum 117, and the toner image is transferred onto a print medium. The transferred toner image is fixed by a fixing device 105. The laser beam printer 100 forms an image on a print sheet by executing the above processes.

This embodiment uses cut print sheets (including plain paper, heavy paper, OHP sheets, and the like). This cut print sheet is set on a paper feed port 118 of the laser beam printer 100, is picked up into the apparatus by a paper feed roller 102 and convey rollers 103, and is fed to the electrostatic drum 117. The print sheet conveyed from the fixing device 105 by conveyance rollers 106 is exhausted onto either of a face-down exhaust port 109 or face-up exhaust port 108 by an exhaust port switching device 107.

Referring to FIG. 3, reference numeral 115 denotes a network adapter which is connected to the network 40 such as a LAN or the like, and is connected to the laser beam printer 100 via the network 40.

The processing of the host computer 3000 upon executing the print processing by the laser beam printer 100 according to the first embodiment will be described below. In this case, the host computer 3000 acquires information about image deformations such as a position shift, curvature, and the like that the print engine 127 undesirably gives to an image upon printing image data, from the laser beam printer 100 via the network transmission/reception unit 30. Note that information about image deformations may be held in the ROM 3 of the host computer 3000 in advance, or may be acquired from the laser beam printer 100 via the network 40 upon printing. The CPU 1 generates a coordinate conversion table for respective words used to cancel image deformations, and vertical correction data as vertical correction information and horizontal correction data as horizontal correction information, which are to be transmitted to the laser beam printer 100, based on the information about image deformations of the print engine 127.

Figure 4:
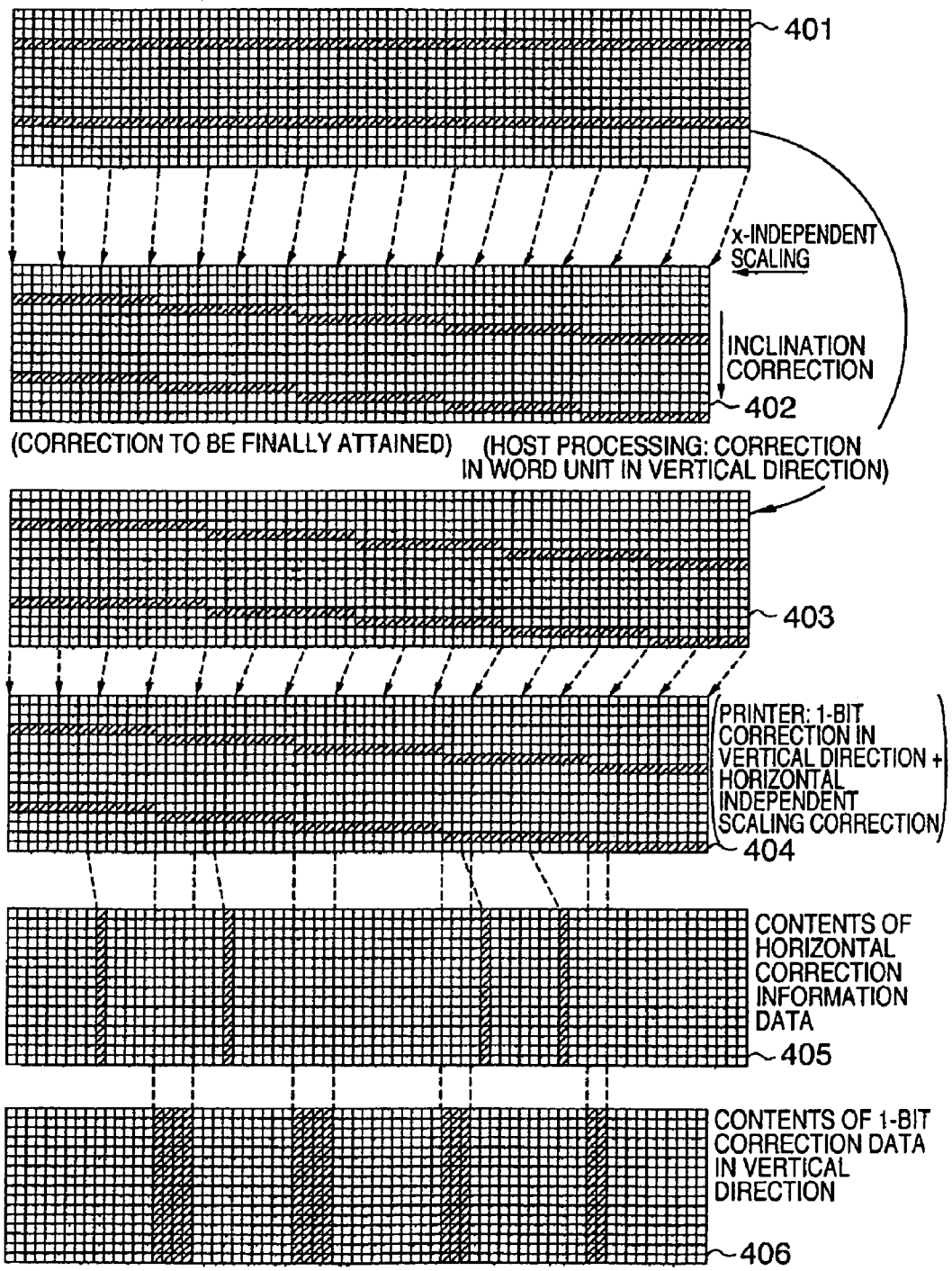
FIG. 4 is a view for explaining details of generation processing of various data for correction in a host computer 3000 according to the first embodiment of the present invention.

FIG. 4 is a view for explaining details of generation processing of various data for correction in the host computer 3000 according to the first embodiment of the present invention. Reference numeral 401 denotes an example of an original image as a source of image data to be printed by the laser beam printer 100, and this embodiment exemplifies an image including two horizontal, transverse lines for the sake of simplicity. Note that each grid in the image 401 indicates one pixel. Also, one word is defined to have a size of 1 pixel (vertical)×5 pixels (horizontal). Note that a word unit means a block unit as a set of predetermined pixels. In a practical printing system, the word unit is desirably a data transfer unit in the host computer 3000 such as 32 bits, 64 bits, or the like. If one pixel is defined by 1 bit, the word unit desirably has a size of 1 pixel (vertical)×32 pixels (horizontal).

Referring to FIG. 4, reference numeral 402 denotes image data to be finally transmitted to the print engine 127 so as to cancel image deformations such as a position shift, curvature, and the like caused when the print engine 127 outputs an image. The image data 402 has undergone correction that shifts, downward in the vertical direction, the coordinates indicating the transverse lines, which are horizontal in the original image, toward the right side, and has undergone independent scaling processing to reduce the image in the horizontal direction.

Referring to FIG. 4, reference numeral 403 denotes image data which undergoes conversion in a word unit (in a block unit of predetermined pixels), which is executed by the CPU 1 in the host computer 3000. Compared to the original image 401, the coordinates of the transverse lines which are horizontal in the original image are shifted downward in the vertical direction toward the right side. By correcting the vertical positions in a word unit in the host computer 3000, a correction amount in an up-and-down direction to be applied on the laser beam printer 100 side can fall within one pixel. This is because inclination components of an image shift of the print engine 127 shift approximately one pixel in the vertical direction per 500 pixels in the horizontal direction.

As described above, the host computer 3000 executes coordinate conversion in a word unit, i.e., at least in an address unit of image data. This unit that the way of address conversion in a word unit is to be determined in advance in place of scanning image data stored in the RAM 2 or external storage device 11 to apply conversion processing of image data to all pixels of the image data. In this way, an effect of greatly reducing the traffic of access of the CPU 1 to the RAM 2 or external storage device 11 and greatly shortening the time required for the correction processing of image data can be provided.

Reference numeral 405 denotes horizontal correction data to be transmitted from the host computer 3000 to the laser beam printer 100. In the data 405, "dark grids" indicate positions where pixels in the horizontal direction are decimated in the laser beam printer 100 from the image data 403 to be transmitted from the host computer 3000 to the laser beam printer 100. The horizontal correction data 405 occupies the same size as the image data 401 (in case of image data of one pixel per bit). As indicated by the correction data 405, the horizontal decimation processing to be executed by the host computer 3000 in the first embodiment has strong, local and periodic tendencies of the positions to be decimated, and assures very high compression efficiency. For this reason, the data size of the horizontal correction data to be transmitted from the host computer 3000 to the laser beam printer 100 can be small. For example, in case of the print engine which must undergo correction to enlarge an image in the horizontal direction, the horizontal correction data which is appended with a flag indicating enlargement or reduction correction at its head position may be sent to the laser beam printer 100.

Furthermore, reference numeral 406 denotes vertical correction data to be transmitted from the host computer 3000 to the laser beam printer 100. In the data 406, the positions of "dark grids" indicate where pixels are to be shifted downward in the vertical direction in the laser beam printer 100. The vertical correction data occupies the same size as the image data 401 (in case of image data of one pixel per bit). Since the vertical correction data 406 has strong, local and periodic tendencies, the compression efficiency is very high. Therefore, the data size of the vertical correction data to be transmitted from the host computer 3000 to the laser beam printer 100 can be small. The laser beam printer 100 corrects the image data 403 using the horizontal correction data 405 and vertical correction data 404, thus obtaining the image data 402.

These three different types of data are time-divisionally transmitted from the host computer 3000 to the laser beam printer 100, and are buffered in the IF unit 116. The buffered data are distributed for respective data types, and are respectively sent to the decompressors 129, 130, and 131. The data that have undergone the decompression processing are stored in the buffers 123, 124, and 125, respectively, and are input to the image correction unit 126 by synchronizing their timings.

Figure 2:
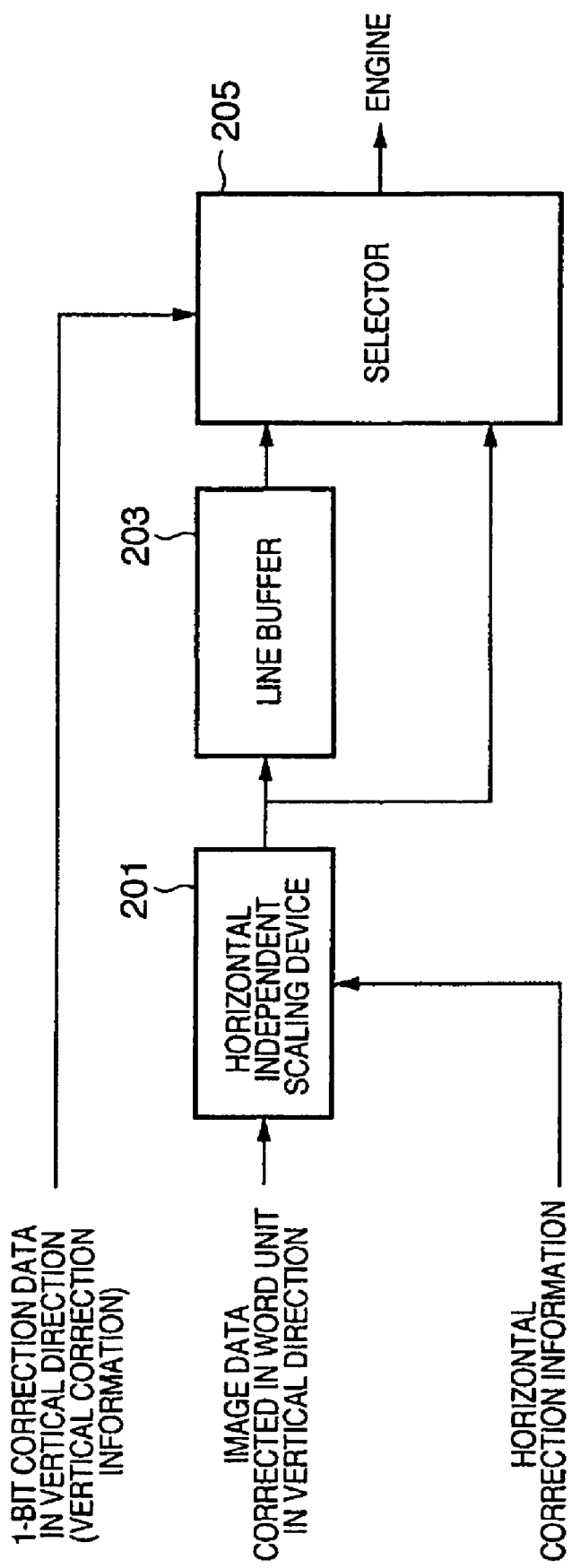
FIG. 2 is a block diagram showing the detailed arrangement of an image correction unit 126 of a laser beam printer 100 according to the first embodiment of the present invention.

FIG. 2 is a block diagram showing the detailed arrangement of the image correction unit 126 of the laser beam printer 100 according to the first embodiment. Referring to FIG. 2, a horizontally independent scaling device 201 executes horizontally independent scaling processing by executing decimation processing of the image data 403 sent from the host computer 3000 in series based on the horizontal correction data 405. The image data 403 which has undergone independent scaling by the horizontally independent scaling device 201 is input to a selector 205 in two systems, i.e., image data one line before, which has undergone delay processing via a line buffer 203, and image data of the current line. The selector 205 selects the value of the current line or that one line before depending on the value of the vertical correction data 406, thus executing the correction processing of the image data in the vertical direction.

The image data 402 output from the selector 205 is transmitted to the print engine 127. The print engine 127 exercises an influence opposite to the correction, which has been applied to the original image 401 due to errors of the mounting position of the rotary polygonal mirror 112 to the laser beam printer 100 and the like, on the image data 402 corrected from the original image 401. In this way, the laser beam printer 100 forms an image on a print sheet as that corresponding to the image 401.

As described above, the printing system according to the first embodiment electrically corrects image deformations such as a curvature, position shift, and the like of an image due to a deformation of the optical system of the printer, pitch nonuniformity of a photosensitive drum, and the like, and forms an image corresponding to an original image on a print sheet.

Note that the first embodiment distributes the load on the correction processing to both the host computer and printer. However, even when the host executes image correction processing in a word unit, and the printer side does not apply the remaining correction processing, a good result can be obtained. Particularly, if inclination components, shift components in the vertical direction, or independent scaling components of an image are small as the performance characteristics of the print engine, the need for the processing arrangement on the printer side can be obviated.

The first embodiment is wherein correction of an image required due to the print engine is divided into that suited to software processing, and that suited to hardware. The first embodiment can also be applied to an embodiment which executes both the processes in only the printer or an embodiment which executes both processes in only the host computer.

Second Embodiment

In the first embodiment, since the host computer executes correction processing in a word unit in the vertical direction, and the printer executes correction processing (complementary processing) in a pixel unit, the load associated with the correction processing in the host computer and printer is distributed. However, the method of the first embodiment often requires correction processing (interpolation processing) in less than one pixel for steps or the like which are generated in the corrected image upon correction in a pixel unit. Hence, in the second embodiment, the host computer executes correction in a pixel unit in the vertical direction, and the printer executes correction processing (interpolation processing) in less than one pixel, thus distributing the load associated with the correction processing of the host computer and printer.

Note that the overall arrangement of the printing system including the host computer 3000 and laser beam printer 100 is the same as that shown in FIG. 1, and a description thereof will be omitted. However, the second embodiment does not comprise the decompressor 129, buffer 123, decompressor 131, and buffer 125 in FIG. 1.

Figure 6:
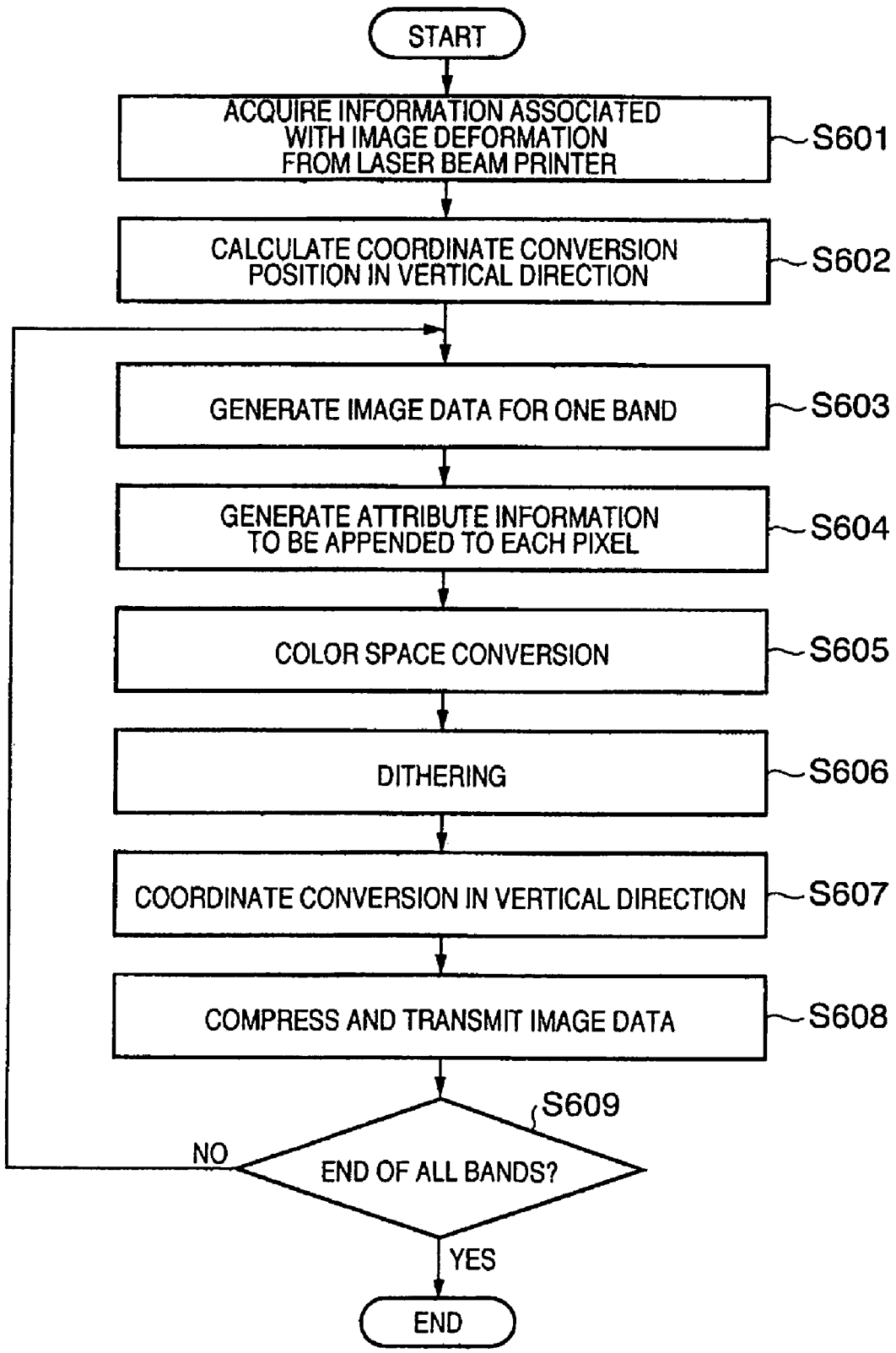
FIG. 6 is a flowchart showing the processing flow in a host computer 3000 according to the second embodiment of the present invention.

The processing of the host computer 3000 upon executing the image interpolation processing and print processing in the laser beam printer 100 according to the second embodiment will be described below using FIG. 6. In this case, the host computer 3000 acquires information associated with image deformations when the print engine 127 forms an image on a print sheet based on image data, from the laser beam printer 100 via the network transmission/reception unit 30 in step S601. Note that the laser beam printer 100 transmits information shown in FIG. 8 to the host computer 3000 as that associated with image deformations. Note that the information shown in FIG. 8 is measured in advance by a measuring device upon manufacture of the laser beam printer 100, and is stored in the controller 101 of the laser beam printer 100.

Figure 7:
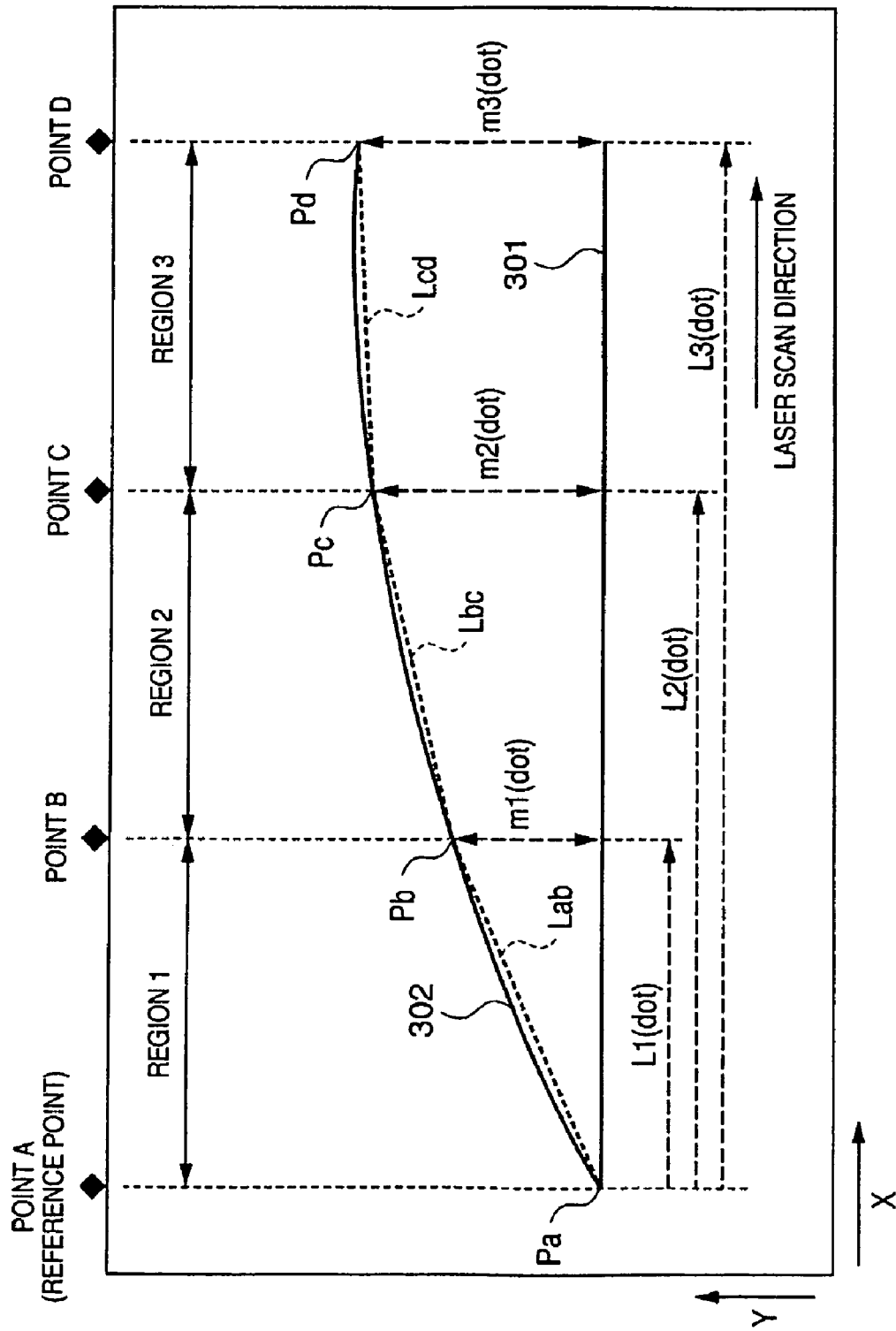
FIG. 7 is a graph showing the deformation of a scan line.

The contents of the information shown in FIG. 8 will be described below using FIG. 7. FIG. 7 is a graph for explaining image deformations caused by assembly errors of the rotary polygonal mirror 11 to the laser beam printer 100. Reference numeral 701 denotes an ideal scan line when the rotary polygonal mirror 11 is free from any assembly errors, and a scan is made upon perpendicularly irradiating the surface of the electrostatic drum 117 with a laser beam coming from the rotary polygonal mirror 11 in a line unit with respect to the rotation direction of the electrostatic drum 117. Reference numeral 702 denotes a scan line which has suffered inclinations and curvatures due to assembly errors of the rotary polygonal mirror 11 to the laser beam printer 100.

In this embodiment, shift amounts between the ideal scan line 701 and the actual scan line 702 are measured in advance at a plurality of points (points B, C, and D) to have point A as a scan start position of a print region as a reference point upon manufacture of the printer. These shift amounts are divided into a plurality of regions (region 1 between Pa and Pb, region 2 between Pb and Pc, and region 3 between Pc and Pd) at the measurement points of the shift amounts, and the inclinations of the scan lines of the respective regions are approximated by straight lines (Lab, Lbc, and Lcd) which connect the neighboring points.

Therefore, when the differences of the shift amounts between the neighboring points (m1 for region 1, m2−m1 for region 2, and m3−m2 for region 3) have positive values, the scan line has an upward inclination; when they have negative values, the scan line has a downward inclination. Several methods of acquiring information associated with image deformations by the host computer 3000 are available. For example, a method of measuring and acquiring image deformations in the manufacturing process of the laser beam printer 100 may be used. Alternatively, in another method, the laser beam printer 100 prints an image deformation measurement chart which is prepared in advance, and an image scanner or the like converts a print sheet on which the chart image is formed into digital data, and the host computer 3000 may acquire information associated with image deformations from the digital information.

In step S602, the CPU 1 calculates positions where coordinate conversions in the vertical direction are executed to cancel image deformations in the vertical direction (sub-scan direction) based on the information associated with image deformations acquired from the laser beam printer 100. More specifically, the CPU 1 calculates the positions where the following coordinate conversions are executed for respective regions. Since an actual coordinate conversion is done in such a manner that the CPU 1 designates and changes a read address upon reading out image data from the RAM 2, the CPU 1 calculates the coordinate conversion position, and then generates a read address corresponding to that position.

Region 1: execute coordinate conversion for one pixel per (L1/m1) dots in the main scan direction;

Region 2: execute coordinate conversion for one pixel per (L2−L1/m2−m1) dots in the main scan direction; and Region 3: execute coordinate conversion for one pixel per (L3−L2/m3−m2) dots in the main scan direction.

In steps S603 to S606, the CPU 1 executes processing for respective bands. A band means an image data block including image data for a plurality of lines (e.g., 10 lines) in the vertical direction (sub-scan direction). In step S603, the CPU 1 generates image data (8 bits per RGB color) for one band, in accordance with a rendering instruction from an application. In step S604, the CPU 1 generates attribute information indicating to which image property each pixel belongs. That is, the CPU 1 serves as attribute determination unit which determines other attributes in an image for respective regions. Note that the attribute information is that which specifies the type of data according to the property of image data. For example, an attribute of an image data region including character data is a text attribute, and an attribute of an image data region including bitmap data is an image attribute. An attribute of an image data region including draw data is a graphics attribute. The CPU 1 determines whether a region including image data is a text attribute, image attribute, or graphics attribute.

In step S605, the CPU 1 executes color space conversion of RGB pixels (8 bits per color) into YMCK image data (8 bits per color). In step S606, the CPU 1 applies dithering to the YMCK image data (8 bits per color) to convert the image data into YMCK halftone image data (2 bits per color). In step S607, the CPU 1 corrects a shift in the vertical direction (sub-scan direction) for one pixel by converting the read destination of an address from the band memory (a part of the storage area of the RAM 2) based on each coordinate conversion position in the vertical direction calculated in step S602. In step S608, the CPU 1 compresses image data for one band, and transmits the compressed image data to the laser beam printer 100 via the network transmission/reception unit 30. The CPU 1 checks in step S609 if processing for all the bands which form image data for one page is complete. If the processing for all the bands in one page is not complete, the process returns to step S603; otherwise, the processing ends.

Figure 11:
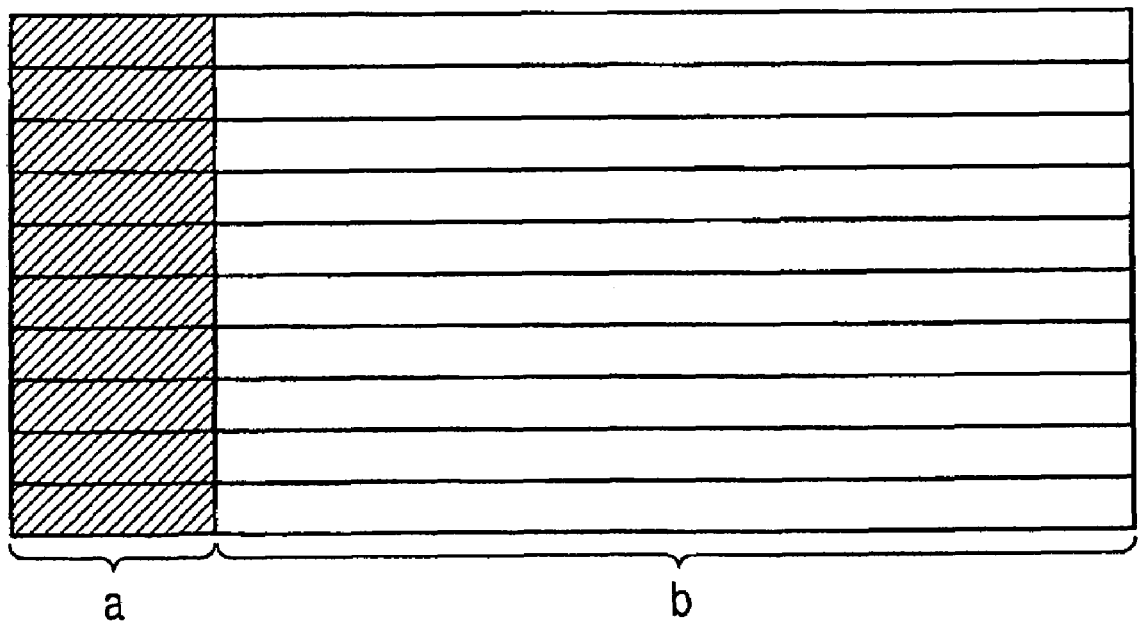
FIG. 11 is a view showing data stored in a band memory before compression in the host computer 3000.

FIG. 11 shows image data in the band memory before compression. Referring to FIG. 11, reference symbol a denotes attribute information indicating the attribute of each pixel and information indicating the coordinate conversion position in the vertical direction, which are required for interpolation processing (halftone processing) in the laser beam printer 100, and are stored in a decimated state with respect to image data denoted by b. A tone correction unit 501 to be described later executes interpolation processing (halftone processing) of a line of interest based on the information stored in this field.

FIG. 9 is a view for explaining coordinate conversion in the vertical direction (sub-scan direction) in the host computer 3000. The CPU 1 offsets the coordinates of the sub-scan direction (Y-direction) of image data stored in the band memory, as indicated by 902, in correspondence with the coordinate conversion positions calculated based on the coordinate conversion information of the main scan line approximated by the straight lines, as indicated by 901 in FIG. 9. More specifically, for region 1, the CPU 1 performs a coordinate conversion for one pixel in the vertical direction per (L1/m1) dots in the horizontal direction (main scan direction). Therefore, (1) to (3) in FIG. 9 indicate the lengths each of (L1/m1) dots in the vertical direction. For region 2, the CPU 1 performs a coordinate conversion for one pixel in the vertical direction per (L2−L1)/(m2−m1) dots in the main scan direction. Therefore, (4) and (5) in FIG. 9 indicate the lengths each of (L2−L1)/(m2−m1) dots in the vertical direction.

Reference numeral 903 denotes an exposure image formed by exposing image data which has undergone color discrepancy correction for respective pixels on the electrostatic drum 117. The laser beam printer 100 executes print processing based on the image data which is transmitted from the host computer 3000 to the laser beam printer 100 when the CPU 1 executes the procedure shown in FIG. 6. A method of generating print data to be transmitted to the print engine 127 based on image data received from the host computer 3000 by the laser beam printer 100 will be described below.

Figure 5:
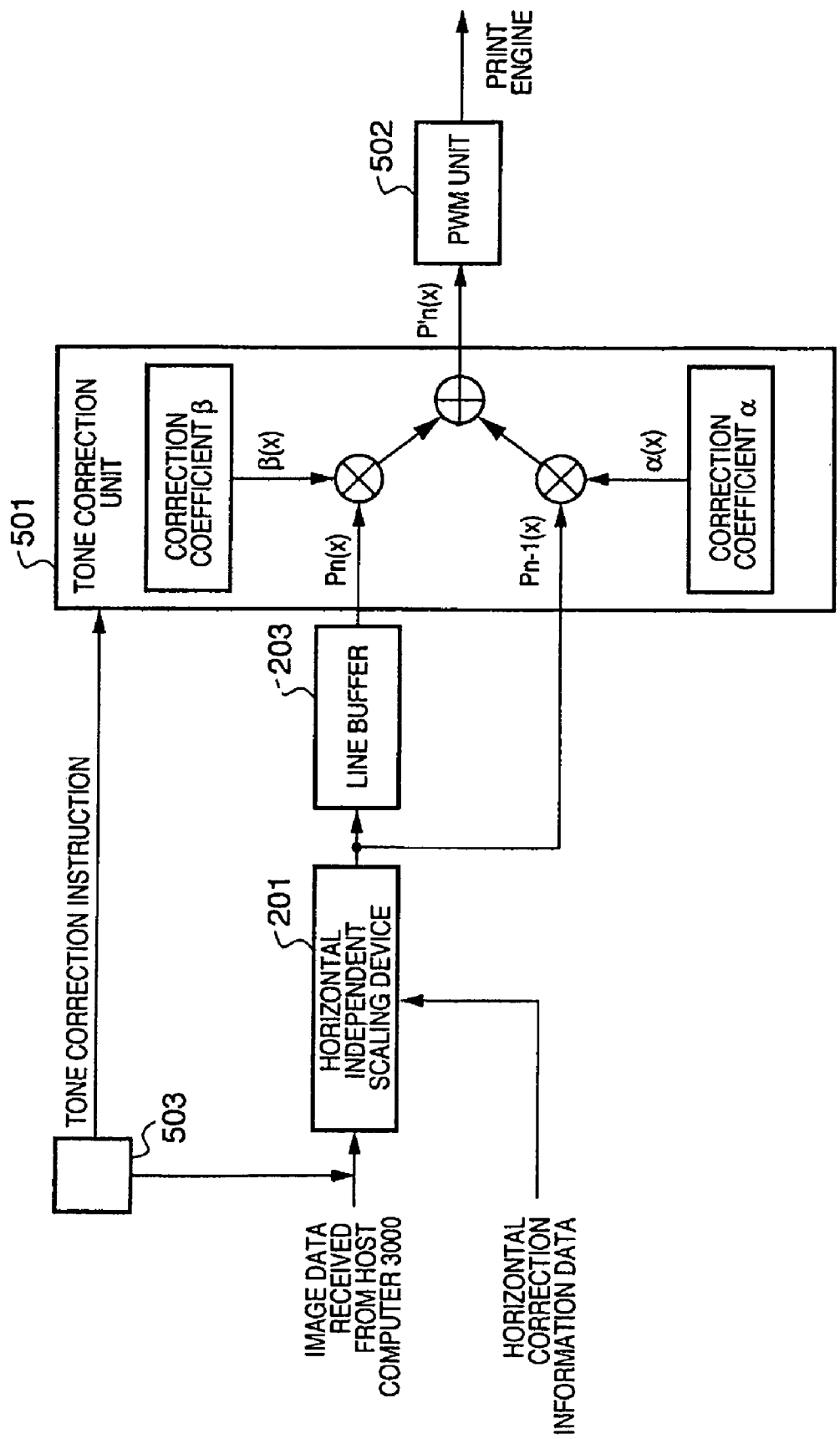
FIG. 5 is a block diagram showing the arrangement of an image correction unit 126 according to the second embodiment of the present invention.

FIG. 5 is a block diagram showing the detailed arrangement of the image correction unit 126 of the laser beam printer according to the second embodiment. Referring to FIG. 5, a horizontal independent scaling device 201 executes independent scaling processing in the horizontal direction by executing decimation processing of image data serially sent from the host computer 3000 based on the horizontal correction data 405. Note that in the first embodiment, the horizontal correction data 405 is received from the host computer 3000. However, in the second embodiment, the horizontal correction data 405 is pre-stored in the controller 101. The image data which has undergone independent scaling by the horizontal independent scaling device 201 is input to the tone correction unit 501 in two systems, i.e., image data one line before which has undergone delay processing via a line buffer 203, and that of the current line. The tone correction unit 501 applies tone correction in less than a pixel unit to the image data which has undergone correction in a pixel unit by the host computer 3000.

The tone correction unit 501 uses the line buffer 203 for one line to refer to the previous and next pixel values in the sub-scan direction to generate correction data. The line buffer 203 stores data for one preceding line, and the tone correction unit 501 simultaneously receives the data for one preceding line, and that for one succeeding line. The tone correction unit 501 executes the following arithmetic processing to generate correction data:

$$P'n(x)=Pn(x)*\beta(x)+Pn-1(x)*\alpha(x)$$

where x (dots) is the coordinate in the main scan direction, Pn(x) is pixel data input from the line buffer 203, and Pn−1(x) is pixel data input from the horizontal independent scaling device 201. With the above arithmetic operation, image data which has undergone tone correction in less than a pixel unit in the sub-scan direction is generated, and is output to the print engine 127.

The image data which has undergone the tone correction by the aforementioned processing undergoes pulse-width modulation processing by a PWM unit 502, and is then output to the print engine 127, thus executing exposure processing to the electrostatic drum 117 as an image carrier.

Note that the tone correction by the tone correction unit 501 is done at the position that has undergone the coordinate conversion in the vertical direction when the attribute information indicates to require tone correction. More specifically, a tone correction instruction unit 503 of the image correction unit 126 extracts information indicating the coordinate conversion position and attribute information (a in FIG. 11) from the image data, and sends, to the tone correction unit 501, information indicating whether to apply tone correction based on a table shown in FIG. 10. The table shown in FIG. 10 is a conversion table used to generate information required for the tone correction based on the attribute information appended to the image data received from the host computer 3000. The image correction unit 126 generates information required for the tone correction, i.e., information indicating whether or not to execute tone correction to be described later, based on the conversion table and the aforementioned attribute information. Note that the tone correction instruction unit 503 issues a tone correction instruction to the tone correction unit 501 when attribute information at the coordinate conversion position specified by the information indicating coordinate conversion position indicates application of tone correction. If no tone correction instruction is issued, the image data of the current line is output to the print engine 127 intact so as to skip tone correction.

Figure 12:
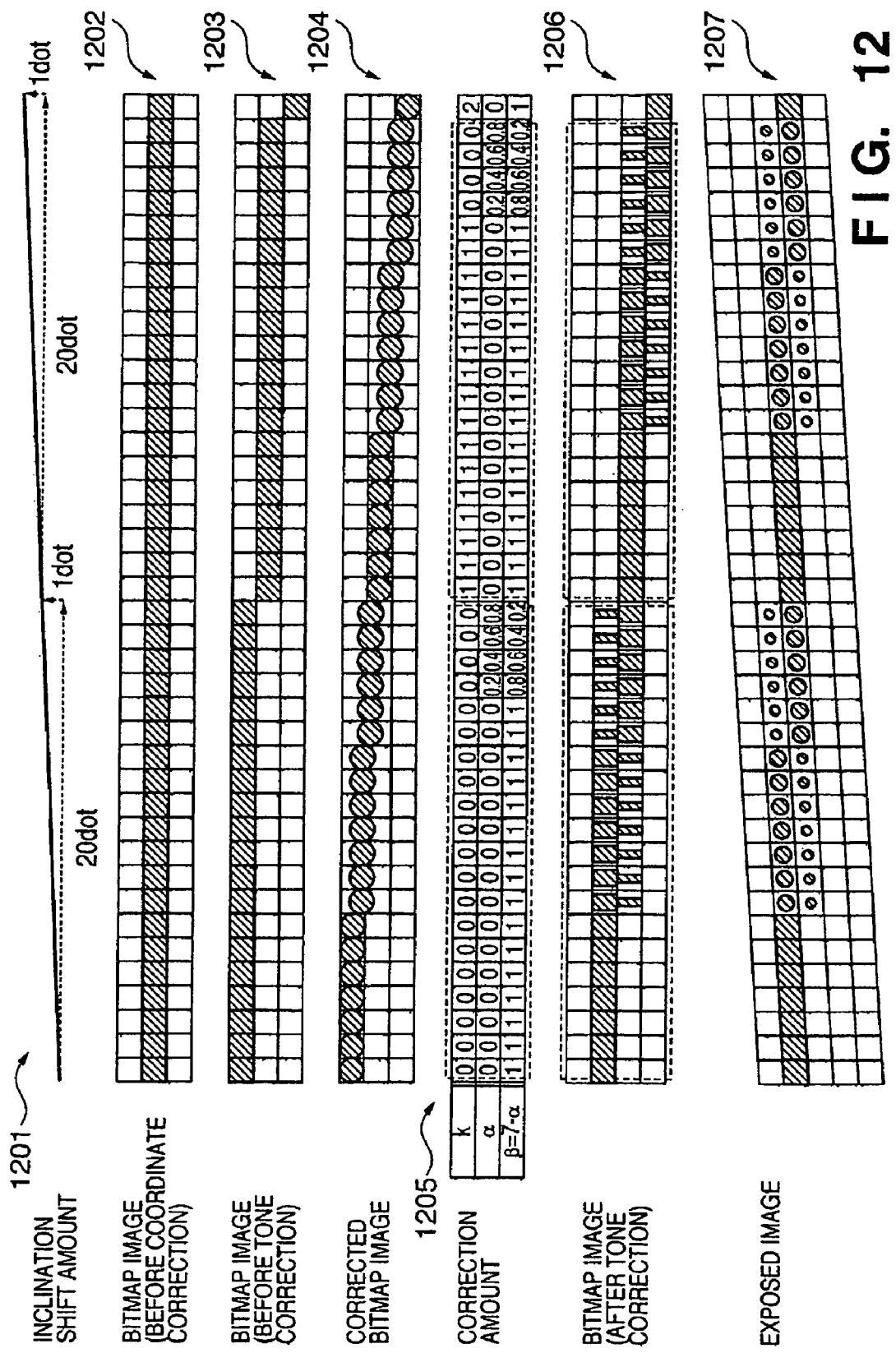
FIG. 12 is a view for explaining tone correction in less than a pixel unit by a tone correction unit 501.

FIG. 12 is a view for explaining tone correction in less than a pixel unit by the tone correction unit 501. The tone correction in less than a pixel unit is executed by adjusting the exposure ratios upon exposing pixels before and after the coordinate conversion position by the PWM unit 502.

Reference numeral 1201 in FIG. 12 denotes a main scan line which has an upward inclination. Reference numeral 1202 denotes image data of a horizontal straight line before coordinate conversion; and 1203, image data before tone correction. Reference numeral 1204 denotes a correction image of 1202 to cancel the inclination of the main scan line 1201. In order to implement the correction image 1204, the exposure amounts upon exposing the pixels before and after the coordinate conversion position are adjusted. Reference numeral 1205 denotes the relationship between k that represents the correction amount in the sub-scan direction for respective pixels, and correction coefficients $\alpha$ and $\beta$ for tone correction. $\alpha$ and $\beta$ are correction coefficients used to apply correction in less than a pixel unit in the sub-scan direction, and represent the distribution ratios of the density (exposure amount) to the previous and next dots in the sub-scan direction. For example, in order to perform tone correction at four pixels, distribution ratios of five levels must be prepared, and more specifically, $\alpha$ and $\beta$ are:

First level: $\alpha=0$, $\beta=1$
Second level: $\alpha=0.2$, $\beta=0.8$
Third level: $\alpha=0.4$, $\beta=0.6$
Fourth level: $\alpha=0.6$, $\beta=0.4$
Third level: $\alpha=0.8$, $\beta=0.2$ ($\beta+\alpha=1$)

where $\alpha$ is the distribution ratio of the previous dot, and $\beta$ is that of the next dot. The level of the distribution ratio is switched at four pixels near the pixel where the coordinate conversion is done, based on the tone correction position information in the main scan direction.

Reference numeral 1206 in FIG. 12 denotes a bitmap image which has undergone tone correction to adjust the exposure ratios upon exposing pixels before and after the coordinate conversion position in accordance with the correction coefficients 1205. Reference numeral 1207 denotes an exposed image of the bitmap image that has undergone the tone correction on a photosensitive drum, in which the inclination of the main scan line is canceled, and a nearly horizontal straight line is formed.

As described above, image data which includes attribute information and information indicating the coordinate conversion positions, which are required for the tone correction, is transmitted from the host computer 3000 to the laser beam printer 100, is received by the IF unit 116, and is buffered by a storage unit 140. The buffered data is sent to the decompressor 130, and the decompressed data is buffered by the buffer 124 again. The decompressed data is transmitted to the print engine 127 in synchronism with a sync signal from the print engine 127. The controller 101 executes the aforementioned operations. The data, which is received by the print engine 127 and includes the attribute information and information indicating the coordinate conversion positions, that are required for the interpolation processing, is input to the image correction unit 126.

The image correction unit 126 extracts appended information (e.g., a in FIG. 11) from the serially sent data. Since the extracted data are decimated in accordance with various modes, they are copied in correspondence with image data (e.g., b in FIG. 11), and correction processing in less than one pixel is applied to the image data based on the copied interpolation processing enabling information and the inclination of curvature information stored by the printer itself. In this way, the correction processing in less than one pixel shown in FIG. 12 can be executed.

The image data output from the image correction unit 126 is transmitted to the print engine 127. The print engine 127 exerts an influence opposite to the correction, which has been done due to factors of deformations, pitch nonuniformity, and the like of a laser beam scan system, to the corrected data. In this way, an output image as an image formed based on the original image data is obtained from the laser beam printer 100.

As described above, in the printing system according to the second embodiment, a curvature, position shift, and the like of an image caused by deformation of an optical system, pitch nonuniformity of a photosensitive drum, and the like of a printer which performs development by irradiating the photosensitive drum with a light beam and forming an electrostatic latent image are electrically corrected to obtain a correct output.

Note that the above embodiment distributes the load on the correction processing to both the host computer and printer. However, even when the host executes image correction processing in a word unit, and the printer side does not apply the remaining correction processing, a pretty good result can be obtained.

Note that the information indicating the coordinate position is calculated by the CPU 1 of the host computer 3000 by transmitting the deformation information shown in FIG. 8 from the laser beam printer 100 to the host computer 3000, but another mode may be adopted. For example, the controller 101 of the laser beam printer 100 may calculate the information indicating the coordinate position based on the deformation information shown in FIG. 8. In this case, the information indicating the coordinate position calculated by the controller 101 is stored in the controller 101. Then, the tone correction instruction unit 503 can execute the aforementioned tone correction based on the information indicating the coordinate position stored in the controller 101.

The first and second embodiment have exemplified a monochrome laser beam printer for the sake of simplicity. However, a color laser beam printer can also have an arrangement that executes the same processing for each color. Furthermore, the above embodiment finally tries correction in one pixel unit, but the present invention can be similarly applied even when correction in less than one pixel is tried.

Moreover, the present invention can be similarity applied to other image forming apparatuses such as a digital multifunctional peripheral equipment having a printer function, which forms and outputs an image upon reception of an instruction from an external apparatus such as a host computer or the like, and the like.

As described above, in the first and second embodiments, the correction of an image required due to the print engine is divided into that suited to software processing, and that suited to hardware. In this way, especially in a system of a host-based printer, a printing system which can attain both high performance and low cost can be configured.

The preferred embodiments of the present invention have been explained, and the present invention can be practiced in the forms of a system, apparatus, method, program, storage medium (recording medium), and the like. More specifically, the present invention can be applied to either a system constituted by a plurality of devices, or an apparatus consisting of a single piece of equipment.

Note that the present invention includes the following case. That is, a program of software that implements the functions of the aforementioned embodiments (programs corresponding to the illustrated flowcharts in the above embodiments) is directly or remotely supplied to a system or apparatus. Then, the invention is achieved by reading out and executing the supplied program code by a computer of that system or apparatus.

Therefore, the program code itself installed in a computer to implement the functional processing of the present invention using the computer implements the present invention. That is, the present invention includes the computer program itself for implementing the functional processing of the present invention.

In this case, the form of program is not particularly limited, and an object code, a program to be executed by an interpreter, script data to be supplied to an OS, and the like may be used as long as they have the program function.

A recording medium for supplying the program, for example, includes a floppy (tradename) disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, the program may be supplied by downloading it from a home page on the Internet to a recording medium such as a hard disk or the like using a browser of a client computer. That is, connection to the home page is established, and the computer program itself of the present invention or a compressed file containing an automatic installation function is downloaded from the home page. Also, the program code that forms the program of the present invention may be segmented into a plurality of files, which may be downloaded from different home pages. That is, the present invention includes a WWW server which makes a plurality of users download a program file required to implement the functional processing of the present invention by the computer.

Also, a storage medium such as a CD-ROM or the like, which stores the encrypted program of the present invention, may be delivered to the user. The user who has cleared a predetermined condition may be allowed to download key information that decrypts the encrypted program from a home page via the Internet. The encrypted program may be executed using that key information to be installed on a computer, thus implementing the present invention.

The functions of the aforementioned embodiments may be implemented by executing the readout program. In addition, the functions of the aforementioned embodiments may also be implemented by some or all of actual processing operations executed by an OS or the like running on the computer based on an instruction of that program.

Furthermore, the functions of the aforementioned embodiments can be implemented after the program read out from the recording medium is written in a memory of an extension board or a function extension unit which is inserted into or connected to the computer. That is, the functions of the aforementioned embodiments can also be implemented by some or all of actual processes executed by a CPU or the like arranged in the function extension board or unit based on the instruction of that program.

The present invention is not limited to the above embodiments and various changes and modifications can be made within the spirit and scope of the present invention. Therefore to apprise the public of the scope of the present invention, the following claims are made.

What is claimed is:

1. An image forming system including a host computer and an image forming apparatus that forms an image based on image data received from said host computer, said host computer comprising:
    a storage unit that stores image data;
    an acquisition unit that acquires, from said image forming apparatus, deformation information indicating how an image formed on a sheet is deformed compared to image data input to said image forming apparatus;
    an address generation unit that generates read addresses for reading image data stored in said storage unit based on the deformation information;
    a correction unit that corrects the image data stored in said storage unit based on read addresses generated by said address generation unit; and
    a transmission unit that transmits the corrected image data to said image forming apparatus,
    said image forming apparatus comprising:
    a receiving unit that receives image data transmitted from said host computer;
    an image carrier that forms an electrostatic latent image on a surface by sensing light;
    an exposure unit that exposes said image carrier based on the received image data;
    a development unit that develops the electrostatic latent image by applying a developing agent to the electrostatic latent image formed on the image carrier;
    a transfer unit that forms an image on a sheet by transferring the developing agent image on the image carrier;
    a setting unit that sets regions in the image data to which tone correction should be applied; and
    a tone correction unit that applies tone correction to the regions in the image data set by said setting unit.

2. The system according to claim 1, wherein said tone correction unit implements the tone correction by adjusting light amounts corresponding to pixels which belong to the regions in the image data set by said setting unit.

* * * * *